United States Patent [19]

Dolan et al.

[11] Patent Number: 5,178,785

[45] Date of Patent: Jan. 12, 1993

[54] HEAT SINK FORMULATION

[75] Inventors: Michael J. Dolan, Brecksville; Carmine M. Doddato, Cuyahoga Falls, both of Ohio; Kenneth R. Butcher, Hendersonville, N.C.

[73] Assignee: Norton Company, Worcester, Mass.

[21] Appl. No.: 758,060

[22] Filed: Sep. 12, 1991

Related U.S. Application Data

[63] Continuation of Ser. No. 552,676, Jul. 11, 1990, abandoned.

[51] Int. Cl.$^5$ ................................................ C09K 5/00
[52] U.S. Cl. ...................................... 252/70; 106/457; 106/459; 106/36; 106/460; 501/141; 126/400
[58] Field of Search ............... 252/70; 106/457, 459, 106/36, 460; 501/112, 82, 95, 127, 141; 165/10 A; 126/400

[56] References Cited

U.S. PATENT DOCUMENTS 3,193,503  7/1965  Smith ............................... 252/62.59
3,959,001  5/1976  Clasen et al. ......................... 501/112
4,178,278  12/1979  Reynolds ............................ 106/36 X
4,476,235  10/1984  Chevalier-Bultel et al. ....... 501/112

*Primary Examiner*—W. J. Shine
*Assistant Examiner*—Douglas J. McGinty
*Attorney, Agent, or Firm*—David Bennett

[57] ABSTRACT

A new heat sink composition having relatively high volumetric heat capacity and relatively high density have been prepared. The compositions comprise a set of formulas including: a) 50-95% oxide of iron and 50-5% of a mixture of clay, an organic binder or an inorganic binder, where said mixture can contain any portion of clay, organic binder or inorganic binder in any proportions provided the mixture adheres to the 50-5% compositional range; b) 15-95% oxide of iron and 85-5% of clay; c) 15-85% oxide of iron, 10-2% of a transition metal oxide other than iron and 75-13% inorganic binder; and d) 50-80% oxide of iron, 15-5% of talc and 35-15% clay. The compositions show good dried and fired properties and can even be loaded and fired in-situ because they possess good dried crush strength.

21 Claims, No Drawings

5,178,785

HEAT SINK FORMULATION

This is a continuation of copending 07/552,676 filed on Jul. 11, 1990, now abandoned.

TECHNICAL FIELD

The invention relates to a heat sink formulation for the recovery of thermal energy and a process for the preparation thereof.

More particularly, this invention relates to various shaped forms capable of receiving and retaining large amounts of thermal energy and transferring said energy to an appropriate medium such as a liquid or a gas.

More specifically, this invention relates to bodies composed of high iron content compositions for use in storage and/or recovery of heat.

BACKGROUND

Heat sink compositions are commonly used in industry where excess thermal energy is generated during any type of plant or industrial operation. For example, heat storage and heat retention are key aspects of many kiln designs and the designs of other types of high temperature processes where the retention of heat is critical to the cost performance of the industrial installation.

Heat storage bodies are generally composed of a number of materials including fired clays, sillimanite, mullite, magnesite and other types of mixed metal or metal oxides. These materials vary with respect to their physical properties including their heat storage capacities, their specific heat, thermal conductivity and their density.

In British Patent 1,262,475, a 100% $Fe_2O_3$ heat storage composition is described for use in electric heating elements. This type of storage core is used to increase efficiency by storing radiant energy. Similarly, in Swiss Patent 453,626, a heat sink is described in which $Fe_3O_4$ is used. This patent shows the oxidation from $Fe_3O_4$ to $Fe_2O_4$ is slow enough that a formulation based on $Fe_3O_4$ is stable at the temperature ranges taught therein.

In U.S. Pat. No. 4,320,022 a dry granular magnetic fraction of asbestos tailings is used to form bricks and other types of heat storage cores. These compositions are made of magnesium oxide, silicon oxide and iron oxide with a special ratio between the magnesium and silica.

In U.S. Pat. No. 4,397,962 a heat or energy storage composition is described in which the element consists of 50-90% magnesium oxide and 5-50% iron oxide and a chemical binder. This is made into small particles and then used to form bricks or other types of shaped forms.

The above teachings all refer to either 100% iron oxide compositions or compositions having 50% or less of iron oxide or asbestos tailings for the manufacture of heat sink materials for recovery or retention of heat in electrical or other types of applications. Asbestos is undesirable for health reasons.

SUMMARY OF THE INVENTION

It is an object of the present invention to provide a heat storage formulation based on a composition containing clays and iron oxide either with or without other transition metal oxides, talc, binder of either inorganic and/or organic, the composition having a specific gravity from about 2.8 to about 4.0 and a relatively high volumetric heat capacity.

A further object of this invention is to provide heat sink materials fabricated from a composition containing iron, clay, other metal oxides, talc, inorganic or organic binders in the form of shapes commonly utilized in the art of refractory materials, such as spheres, saddles, pellets, rings, balls, tubes and other similar shapes.

Another object of this invention is to provide a heat sink element comprising a high iron clay, iron oxide waste in the form of iron oxide dust, having small amounts of other oxide contaminants in the transition metal series including metals like vanadium, molybdenum, tungsten, titanium, cobalt, chromium, nickel or other similar oxides and inorganic and/or organic binders.

Still another object of this invention is to provide heat sink materials containing high amounts of iron oxide material in the range between 5-95% admixed with a clay, inorganic or organic binder, or a mixture thereof.

All of the percentages referred to in this application are weight percentages, unless otherwise specified.

The heat storage composition or formulation of the present invention comprises a composition selected from the representative and illustrative class of:

1) from about 50%-95% of an oxide of iron and from about 50%-5% of at least one clay, sufficient binder of either an inorganic or organic nature or a mixture thereof to bind said oxide and clay together as a shaped object;

2) from about 5% to 95% of an oxide of iron and from about 95% to 5% of at least one clay preferably from about 50% to 95% of an oxide of iron and 50% to 5% of at least one clay;

3) from about 15% to 85% of an oxide of iron, 10% to 0% of a transition metal oxide other than iron and 75% to 15% of an inorganic binder, an organic binder, at least one clay or a mixture thereof, preferably from about 40% to 85% of an oxide of iron, 10% to 0% of a transition metal oxide other than iron and 50% to 15% of an inorganic binder, an organic binder, at least one clay, or a mixture thereof; and 4) from about 50% to 80% of an oxide of iron, 15% to 5% of talc and 35% to 15% of at least one clay.

The clay can be a low iron content or a high iron content clay. The low iron clay is normally less than about 2% while the high iron content clay is normally greater than or equal to 2%. The clay can be selected from any number of clays including, but not restricted to, bentonite, kaolin, fire clay, ball clay, red shale clay, nontronite, montmorillonite, berdellite, protolithionite, zennwaldite, brotite, annite or mixtures thereof with Fireclay and Bentonite being particularly preferred.

The term oxide of iron is used here in a generic sense and is meant to encompass not only the true oxides of iron such as but not restricted to, FeO, $Fe_2O_3$, or $Fe_3O_4$, but also iron silicates, iron alumina silicates, iron sulfates, iron sulfites, iron carbonate, iron salts, iron hydroxides, iron oxide hydroxides, hydrated iron oxides, iron containing minerals or higher oxides of iron or mixtures thereof.

The transition metal oxides can be any of the transition metals other than iron in an oxide form or any other form known in the art. These include, but are not restricted to, oxides or other ores known in the art of such transition metals as cobalt, molybdenum, tungsten, vanadium, nickel, titanium, manganese and other similar transition metals and combinations thereof. These transition metals are commonly found in conjunction with the manufacturing of steel or iron in steel or iron works or are found as material occurring contaminants to iron ores or oxides. Also, the iron oxides that are used in this invention can be those commonly found as waste components in the manufacturing of steel in steel mills or as emanate from ore converting process to produce base metals, e.g. copper, zinc, tin, as a fine dust of some type of mixed iron oxide composite. However, all types of iron containing materials are usable including iron ores. The inorganic binders most commonly associated with this invention are sodium silicate. However, other types of inorganic binders are usable, such as potassium silicate, ammonium silicate, or other types of silicate compositions that can be used in a binder capacity. The organic binders which are also commonly known as extrusion aids or can aid in both a binding and extrusion including but not limited to cellulose, carboxymethylcellulose, carboxyethylcellulose, tall oil, xanthin gum, surface active agent, flocculent, polyacrylamide, carbon black, starch, stearic acid, polyacrylic acid, polyvinyl alcohol, biopolymers, glucose, polyethylene glycol and mixtures thereof.

The compositions of the present invention can be formed into any desirable shape including but not limited to tubes, spheres, Intalox ™ saddles, Super Intaloxx ™ saddles, Berl saddles, slotted ring Tower Packing ™, Rasching Rings ™, cross-partition rings, Lessin rings, balls, pellets, bricks, monoliths and honeycombs.

The compositions of the present invention are characterized by having relatively high volumetric heat capacities in the desired temperature range. Volumetric heat capacity is a measure of the ability of a composition to absorb heat for a given volume. The measure is the product of a composition's average heat capacity and its density.

The average heat capacity of a composition can be determined by calculating the value using basic thermodynamic equations. Thus, the volumetric heat capacity for a standard alumina silica clay such as andalusite can be calculated as follows:

Definitions $C_p$ ≡ heat capacity at constant pressure
$d$ ≡ density
$MW$ ≡ molecular weight
$VC_p$ ≡ volumetric heat capacity at constant pressure
$AC_p$ ≡ average heat capacity at constant pressure
$\Delta H$ ≡ change in enthalpy
$\Delta T$ ≡ change in temperature Physical Properties of Andalusite $MW$(andalusite) = 162 g/mole
$C_p$(andalusite) = 43.96 + 0.001923T − 1086000/$T^2$ Now, consider a temperature rise from 422° k (300° F.) to 1256° k (1800° F.) which corresponds to a usable heat sink temperature range, then the volumetric heat capacity can be calculated as follows:

$$\Delta H(\text{andalusite}) = \int_{422}^{1256} C_p dT$$

$$= 43.96 \times T + \frac{0.001923}{2} \times T^2 + \frac{1086000}{3T^3} \Big|_{422}^{1256}$$

$$= 38099 \text{ cal/mole}$$

$\Delta T = 1256°$ K. $- 422°$ K. $= 834°$ K.

$$AC_p(\text{andalusite}) = \frac{\Delta H}{MW \cdot \Delta T} = \frac{38009 \text{ cal/mole}}{162 \text{ g/mole} \times 834° \text{ K.}}$$
$$= 0.218 \text{ cal/°K. g}$$

$d$(andalusite) = 2.2 g/cm$^3$ $VC_p$(andalusite) = 2.2 g/cm$^3$ × 0.2813 cal/g°k.
= 0.6189 cal/°k. cm$^3$ Now consider a heat sink composition which is 70% Fe$_3$O$_4$ and 30% andalusite using the same temperature range.

Physical Properties of Fe$_3$O$_4$ $MW$(Fe$_3$O$_4$) = 231.55 g/mole
$C_p$(Fe$_3$O$_4$) = 41.17 + 0.0182T − 979500/$T^2$ $$\Delta H(\text{Fe}_3\text{O}_4) = 41.17T + \frac{0.018882T^2}{2} + \frac{979500}{3T^3} \Big|_{422}^{1256}$$
$$= 47504 \text{ cal/mole}$$

$AC_p$(Fe$_3$O$_4$) = 0.246 cal/°K. g

A composition of 70% Fe$_3$O$_4$ and 30% andalusite by weight has a measured density (d) of 3.64 g/cm$^3$ and the volumetric heat capacity is:

$VC_p$(composition) ≈ 0.3 × 0.2813 + 0.7 × 0.246
= 0.934 cal/°K. cm$^3$

Thus, a model heat sink composition based on 70% Fe$_3$O$_4$ and andalusite has a vol. sph which is 1.509 times that of a pure andalusite heat sink. All the data used in the above calculations where taken from *Perry's Chemical Engineering Handbook*, 4th edition.

Compositions of the present invention have volumeric heat capacities at least 50% higher than on all clay compositions and preferably at least 100% higher volumeric heat capacity over an all clay composition. Although the above definition and calculations of volumeric heat capacity illustrate the distinction of this heat composition of the present invention, the calculations given above are only estimations of the actual volumeric heat capacities.

The process for manufacturing the heat sink formulations of the present invention comprises forming a mixture having one of the above specified compositions in any type of suitable mixing unit commercially available including but not limited to extruders, tumblers, or other equipment well known in the art, adjusting the plasticity of the mixture by the addition of from about 2% to 30% water, based on the weight of the resulting mixture, shaping the mixture into a shape and then calcining the shape at a temperature sufficient to attain a stable form in a temperature range from about 500° C. to about 1500° C. for a time sufficient to render the form stable. The composition formulas sum to 100% in a dry formulation or substantially dry formulation. Water is then added as a weight percent of the completed formulas so that the dry material composition will be proportionally the same. The calcining or firing time is controlled more by the type of firing equipment than by a necessity to hold the shaped mixture at a given temperature for a given period of time. Thus, typically mere attainment of the desired temperature is sufficient to effect calcination. However, the shaped mixture can be held at the desired temperature for a duration from about 5 minutes to about 12 hours or more, with 5 minutes to 4 hours being preferred.

The addition of water or a water-organic binder mixture to adjust the plasticity of the composition is necessary for efficient extrusion or shaping and is a process and procedure well known in the art.

A modified version of this process includes all the above steps except that the calcining step is replaced by a drying step where the drying takes places in a temperature range from about 80° C. to about 300° C. for a time from about several minutes to about 12 hours or longer. The dried heat sink composition preferably has enough strength to be transported, loaded into a reactor as is, and calcined in situ saving the considerable expense of precalcination.

The heat sink compositions of the present invention can be used as column packing material for the efficient and economical recovery of heat generated by exothermic reaction, heat lost to stacks in the form of hot gases or hot liquids, or retention of heat in a given reaction zone, thus decreasing overall heating costs. The compositions of the present invention are also essentially non attriting and maintain their shape and integrity over extended periods of use.

All compositions are specified in percentages based on weight of the components in a substantially dry form. Thus, 100% indicates a complete formulation.

PREFERRED EMBODIMENT

Applicants have found that compositions having 95-5% of at least one clay, 5-95% of an oxide of iron which includes other iron ore and compounds containing iron, 0-10% of a transition metal oxide other than iron, 0-20% of talc, 0-40% of an inorganic binder, 0-20% of an organic binder which also acts as extrusion aids, and are ideally suitable for manufacturing high crush strength, high density, high heat retention materials for use as heat sink compositions.

These compositions have numerous advantageous properties including high crush strengths after simple drying which allows the compositions to be loaded directly into a reactor or column without prior calcination. Calcination actually takes place in the conditioning step of the heat retention zone in a reactor or column.

There are a number of preferred embodiments of the compositions taught in the present invention.

The first embodiment is a composition comprising from about 50% to about 95% of an oxide of iron and from about 50% to about 5% of at least one clay or an inorganic binder or an organic binder, in a mixture thereof. The actual amounts of clay, organic binder and inorganic binder can be any mixture of the three including only one, only two, or all three, and in any proportion, provided their final weight percent when summed with the weight percent of an oxide of iron adds to 100%.

A second embodiment of the present invention comprises from 15% to about 95% of an oxide of iron, and about 85% to about 5% of at least one clay. A preferred composition comprises from about 50% to about 95% of an oxide of iron and from about 50% to about 5% of at least one clay.

A third embodiment comprises from about 15% to about 85% of an oxide of iron, from about 10% to about 0% of a transition metal oxide other than iron, from about 75% to about 15% of at least one clay, an inorganic binder, an organic binder or a mixture thereof. A preferred composition of the second embodiment comprises from about 40% to about 95% of an oxide of iron, from about 10% to about 0% of a transition metal oxide other than iron, and from about 50% to about 15% of at least one clay, an inorganic binder, an organic binder, or a mixture thereof. The actual amounts of clay, organic binder and inorganic binder can be any mixture of the three including only one, only two, or all three, and in any proportion, provided their final weight percent when summed with the weight percent of an oxide of iron adds to 100%.

A fourth embodiment comprises from about 50% to about 80% of an oxide of iron, from about 15% to about 5% of talc and from about 35% to about 15% of at least one clay.

These embodiments of the present invention show high structural stability in a dried form as well as high structural stability in a fired or calcined form. The heat sink composition also shows high density and high volumetric heat capacity. This is necessary for use as a heat sink material. The composition also shows superior extrusion and shaping capabilities due to the fact that the plasticity can be easily adjusted and the composition becomes stronger quicker upon drying and can actually maintain its shape extraordinarily well after simple drying. The dried form of this embodiment can be used directly as a heat sink material where calcination occurs during the conditioning step of bringing the heat sink bed on-stream to recover part of the latent heat during the operation of heat generating reactions or reactions which require large amounts of heat to operate, such as the oxidation of chlorinated wastes.

The oxides of iron used in these embodiments can come from the powered waste from blast furnaces in the iron or steel industries or as emanates from ore converting process to produce base metals, e.g. copper, zinc, tin, and is generally a mixture of oxides of iron and oxides of other transition metals in small amounts used in the manufacture of iron and/or steel products including such oxides as cobalt, molybdenum, tungsten, vanadium, nickel, titanium, manganese and others recovered as waste.

The oxides of iron used in this invention are also meant to include iron silicates, iron alumina silicates, iron sulfates, iron sulfites, iron carbonate, iron salts, iron hydroxides, iron oxide hydroxides, hydrated iron oxides, iron containing minerals or higher oxides of iron or mixtures thereof. The oxides of iron can also contain small amounts of ingredients such as carbon, boron and nitrogen used in either making carbon steel, boron enriched steel, or nitride enriched steel. However, the oxide of iron that can be used for these embodiments can be obtained from sources other than powered wastes from iron and/or steel production.

The inorganic binders and organic binders and clay are used to increase the extrudability and flow properties of the oxides of iron and transition metal oxides and add structural strength to the composites before, during and after drying or firing to form the heat sink materials of the present invention.

The invention will be better understood by reference to the following illustrated examples.

EXAMPLE 1

This example illustrates the general process for making the composition of this invention.

The iron oxide powder was dried at 110° C. overnight at a loss on ignition of less than 2%. The powder was then screened to remove particles greater than 50 mesh. A dry mix of 8 kg of oxide iron powder, 2 kg of clay and 25 g of extrusion aid (organic binder) were mixed in a high intensity mixer for one minute. Next, a solution of 15 mL of soap (organic binder) and 1.7 L of water was added to the dry mix and mixed for 5 minutes. The extrusion aids used usually equalled 0-2%.

The mix was then fed into an auger-vacuum chamber extruder and extruded as rings. A die was used with a 0.75 inch OD and pin of 0.5 inches OD. The extrudate was cut so that the length was equal to the OD.

The extrudate was air dried overnight, and finish dried at 110° C. for two hours. The rings were fired in an electric kiln to 1290° C., at the rate of 65° C. per hour and soaked for three hours. The rings were tested for density and porosity using ASTM Method C373 56. Properties follow:

| | |
|---|---|
| Apparent Porosity, % | 12.7 |
| Water Absorption, % | 3.9 |
| Apparent Specific Gravity | 3.72 |
| Particle Density, gm/cc | 3.25 |

EXAMPLE 2

This example illustrates a series of compositions prepared according to Example 1. The composition and composition properties are listed in Table I.

The compositions described in Table I are based on 50-81% of Fire clay in either a 20 mesh or 60 mesh dry particle size and 19-50% of an oxide of iron. In Table I mesh is represented by M.

The properties of the composition include crush strength ranging from about 150-550 lbs, packing density ranging from about 90 to about 120 lbs/ft, particle density from about 2.5-3.5 g/mL, and apparent specific gravities from 2.5-5.0. The composition also has some variation in percent water absorption (0.5-15) and percent apparent porosity (2-35).

EXAMPLE 3

This example illustrates a series of compositions prepared according to Example 1. The composition and composition properties are listed in Table II.

The data in Table IIA shows the composition and properties of ring shaped heat sinks. While Table IIB shows the same for saddles. The compositions use dried iron oxide from 75-85%, bentonite clay from 15-20% and 0-5% of a series of other clays and inorganic binders fused between 2,000-2,200° F. under a variety of kiln heating procedures well known in the art.

The ring heat sinks show crush strength ranging from 70-100 lbs, density of 2.5-4.0 g/mL and packing density of 90-105 lbs/ft. XRD measurements on two of the heat sink rings confirmed the existence of $Fe_2O_3$. Similar results are found in the saddle heat sinks.

While in accordance with the patent statutes the best mode and preferred embodiment of the invention has been described, it is to be understood that the invention is not limited thereto, but rather is to be measured by the scope and spirit of the appended claims.

TABLE I-A

| | THERMAL ENERGY STORAGE MEDIA | | | | | | |
|---|---|---|---|---|---|---|---|
| Sample Number | 81286 | 81287 | 81288 | 81338 | 81339 | 81440 | 81441 |
| Size, Inches | 0.50 | 0.50 | 0.50 | 0.50 | 0.50 | 0.50 | 0.50 |
| Shape | spheres | | | | | | pellets |
| Apparent Porosity, % | 14.68 | 8.03 | 2.29 | 9.66 | 7.23 | 34.72 | 8.96 |
| Water Absorption, % | 5.05 | 2.91 | 0.86 | 3.32 | 2.48 | 14.33 | 3.28 |
| Apparent Specific Gravity | 3.41 | 3.00 | 2.72 | 3.23 | 3.16 | 4.89 | 3.23 |
| Particle Density, g/cc | 2.91 | 2.76 | 2.6 | 2.92 | 2.92 | 3.19 | 2.74 |
| Crush strength, lbs | 152.8 | 361.8 | 355.8 | 215.0 | 528.0 | | |
| Packing Density, lbs/ft | 98.97 | 95.6 | 93.2 | 95.0 | 100.0 | 101.0 | 105.3 |
| Dilatometer | | | | | | | |
| Green °C. −1300° C., % | −3.5 | −4.45 | +5.35 | −5.62 | −4.98 | | |
| Fired °C. −1250° C., % | −0.03 | −0.17 | −0.15 | +0.55 | +0.58 | | |
| Drop Test, % Intact | | | | | | | |
| Formulation, % Ceramic | | | | | | | |
| Fireclay −20M | 60 | 73 | 81 | 50 | ND | 50 | 50 |
| Fireclay −60M | ND | ND | ND | ND | ND | ND | ND |
| Iron Oxide | 40 | 27 | 19 | 50 | 50 | 50 | 50 |
| Zircon | ND | ND | ND | ND | 50 | ND | ND |
| Extruder | FRH | FRH | FRH | FRH | FRH | CC-1 | CC-1 |
| Firing Temp, °F. | 2160 | 2160 | 2300 | 2150 | 2150 | 2225 | 2225 |

TABLE I-B

| | THERMAL ENERGY STORAGE MEDIA | | | | | |
|---|---|---|---|---|---|---|
| Sample Number | 81604 | 81605 | 81632 | 81633 | 82788 | 82358 |
| Size, Inches | 0.50 | 0.50 | 0.50 | 0.50 | 0.50 | 0.50 |
| Shape | spheres | pellets | spheres | pellets | spheres | spheres |
| Apparent Porosity, % | 8.47 | 4.69 | 6.55 | 8.50 | 11.69 | 4.36 |
| Water Absorption, % | 2.87 | 1.03 | 2.30 | 2.90 | 4.01 | 1.51 |
| Apparent Specific Gravity | 3.23 | 3.03 | 3.07 | 3.17 | 3.30 | 3.03 |
| Particle Density, g/cc | 2.95 | 2.88 | 2.96 | 2.90 | 2.91 | 2.89 |
| Crush strength, lbs | ND | ND | 170.8 | 215.0 | ND | 265.6 |
| Packing Density, lbs/ft | 106.4 | 108.0 | 105.0 | 113.6 | ND | 105.4 |
| Dilatometer | | | | | | |
| Green °C. −1300° C., % | | | | | | |
| Fired °C. −1250° C., % | | | | | | |
| Drop Test, % Intact | | | 13.3 | 76.7 | | |
| Formulation, % Ceramic | | | | | | |
| Fireclay −20M | ND | ND | ND | ND | ND | ND |

TABLE I-B-continued

| | THERMAL ENERGY STORAGE MEDIA | | | | | |
|---|---|---|---|---|---|---|
| Sample Number | 81604 | 81605 | 81632 | 81633 | 82788 | 82358 |
| Fireclay —60M | 50 | 50 | 50 | 50 | 50 | 50 |
| Iron oxide | 50 | 50 | 50 | 50 | 50 | 50 |
| Zircon | ND | ND | ND | ND | ND | ND |
| Extruder | CC-1 | CC-1 | CC-1 | CC-1 | CC-1 | CC-1 |
| Firing Temp, °F. | 2250 | 2400 | 2350 | 2350 | 2300 | 2350 |

TABLE II-A

| | THERMAL ENERGY STORAGE MEDIA | | | | | | |
|---|---|---|---|---|---|---|---|
| Sample Number | 8983329 | 898338 | 8983339 | 8983370 | 8983371 | 9083021 | |
| Size, Inches | 0.75 | 0.75 | 0.75 | 0.75 | 0.75 | 0.75 | |
| Shape | rings | rings | rings | rings | rings | saddles | |
| Apparent Porosity, % | 24.1 | 16.5 | 15.7 | 27.7 | 24.4 | ND | |
| Water Absorption, % | 7.9 | 5.6 | 5.2 | 9.0 | 8.4 | 12.4 | |
| Apparent Specific Gravity | 4.05 | 3.53 | 3.56 | 3.91 | 3.86 | ND | |
| Particle Density, g/cc | 3.07 | 2.95 | 3.01 | 2.83 | 2.92 | ND | |
| Crush strength, lbs | 76.4 | 92.2 | 99.4 | 71.2 | 86.5 | ND | |
| Packing Density, lbs/ft | 98.97 | 95.6 | 93.2 | 95.0 | 100.0 | 101.0 | XDR |
| | ND | Fe2O3 | Fe2O3 | ND | ND | ND | |
| Formulation, % Ceramic | | | | | | | |
| Iron Oxide, Dry | 80.0 | 75.0 | 75.0 | 75.0 | 75.0 | 85.0 | |
| Bentonite 1 | 20.0 | 20.0 | 20.0 | 20.0 | 20.0 | 15.0 | |
| F-4 Feldspar | 0.0 | 5.0 | 0.0 | 5.0 | 0.0 | 0.0 | |
| Nepheline Syenite, | 0.0 | 0.0 | 5.0 | 0.0 | 5.0 | 0.0 | |
| Bentonite 2 | 0.0 | 0.0 | 0.0 | 0.0 | 0.0 | 0.0 | |
| Bentonite 3 | 0.0 | 0.0 | 0.0 | 0.0 | 0.0 | 0.0 | |
| Firing Temp, °F. | *2150 | **2200 | **2200 | **2100 | **2100 | ***2000 | |
| Kiln # | 2 | 3 | 3 | 3 | 3 | 4 | |

\*100° F./hour ramp, 5 hour soak
\*\*Daisy ramp, no soak
\*\*\*Daisy ramp, no soak, reducing atmosphere
\*\*\*\*150° F./hour ramp, 3 hour soak

TABLE II-B

| | THERMAL ENERGY STORAGE MEDIA | | | | | | |
|---|---|---|---|---|---|---|---|
| Sample Number | 9083022 | 9083023 | 9083024 | 9083040 | 9083041 | 9083042 | |
| Size, Inches | 2.00 | 2.00 | 2.00 | 2.00 | 2.00 | 2.00 | |
| Shape | saddles | saddles | saddles | saddles | saddles | saddles | |
| Apparent Porosity, % | ND | ND | 33.5 | ND | ND | ND | |
| Water Absorption, % | 16.2 | 12.0 | 12.2 | 9.2 | 10.0 | 9.3 | |
| Apparent Specific Gravity | ND | ND | 4.15 | ND | ND | ND | |
| Particle Density, g/cc | ND | ND | 2.76 | ND | ND | ND | |
| Crush strength, lbs | ND | ND | — | ND | ND | ND | |
| Packing Density, lbs/ft | 98.97 | 95.6 | 93.2 | 95.0 | 100.0 | 101.0 | XDR |
| | ND | ND | Fe2O3 | ND | ND | ND | |
| Formulation, % Ceramic | | | | | | | |
| Iron Oxide, Dry | 80.0 | 80.0 | 80.0 | 85.0 | 80.0 | 80.0 | |
| Bentonite 1 | 20.0 | 0.0 | 0.0 | 15.0 | 20.0 | 0.0 | |
| Feldspar | 0.0 | 0.0 | 0.0 | 0.0 | 0.0 | 0.0 | |
| Nepheline Syenite | 0.0 | 0.0 | 0.0 | 0.0 | 0.0 | 0.0 | |
| Bentonite 2 | 0.0 | 20.0 | 0.0 | 0.0 | 0.0 | 20.0 | |
| Bentonite 3 | 0.0 | 0.0 | 20.0 | 0.0 | 0.0 | 0.0 | |
| Firing Temp, °F. | ***2000 | ***2000 | ***2000 | ***2250 | ***2250 | ***2250 | |
| Kiln # | 4 | 4 | 4 | 4 | 4 | 4 | |

\*100° F./hour ramp, 5 hour soak
\*\*Daisy ramp, no soak
\*\*\*Daisy ramp, no soak, reducing atmosphere
\*\*\*\*150° F./hour ramp, 3 hour soak

TABLE II-C

| | THERMAL ENERGY STORAGE MEDIA | | | | | | |
|---|---|---|---|---|---|---|---|
| Sample Number | 9083043 | 9083044 | 9083045 | 9083046 | 9083047 | 9083071 | |
| Size, Inches | 2.00 | 2.00 | 2.00 | 2.00 | 2.00 | 2.00 | |
| Shape | saddles | saddles | saddles | saddles | saddles | saddles | |
| Apparent Porosity, % | 27.1 | ND | ND | ND | 12.7 | 6.0 | |
| Water Absorption, % | 9.1 | 4.4 | 4.2 | 3.1 | 3.9 | 2.0 | |
| Apparent Specific Gravity | 4.10 | ND | ND | ND | 3.72 | 3.31 | |
| Particle Density, g/cc | 2.99 | ND | ND | ND | 3.25 | 3.11 | |
| Crush strength, lbs | ND | ND | ND | ND | ND | ND | |
| Packing Density, lbs/ft | 98.97 | 95.6 | 93.2 | 95.0 | 100.0 | 101.0 | KRO |
| | Fe2O3 | ND | ND | ND | Fe2O3 | ND | |
| Formulation, % Ceramic | | | | | | | |
| Iron Oxide, Dry | 80.0 | 85.0 | 80.0 | 80.0 | 80.0 | 80.0 | |

TABLE II-C-continued

| | THERMAL ENERGY STORAGE MEDIA | | | | | |
|---|---|---|---|---|---|---|
| Sample Number | 9083043 | 9083044 | 9083045 | 9083046 | 9083047 | 9083071 |
| Bentonite 1 | 0.0 | 15.0 | 20.0 | 0.0 | 0.0 | 0.0 |
| Feldspar | 0.0 | 0.0 | 0.0 | 0.0 | 0.0 | 0.0 |
| Nepheline Syenite | 0.0 | 0.0 | 0.0 | 0.0 | 0.0 | 0.0 |
| Bentonite 2 | 0.0 | 0.0 | 0.0 | 20.0 | 0.0 | 0.0 |
| Bentonite 3 | 20.0 | 0.0 | 0.0 | 0.0 | 20.0 | 20.0 |
| Firing Temp, °F. | ***2250 | ***2350 | ***2350 | ***2350 | ***2350 | ****2417 |
| Kiln # | 4 | 4 | 4 | 4 | 4 | hot rod |

*100° F./hour ramp, 5 hour soak
**Daisy ramp, no soak
***Daisy ramp, no soak, reducing atmosphere
****150° F./hour ramp, 3 hour soak

What is claimed is:

1. A heat storable composition having a specific gravity from about 2.8 to about 4.0 and a volumetric heat capacity that is at least 50% higher than that of a pure clay, said composition comprising a metal oxide and a binder, said binder containing sufficient clay alone or combined with either an inorganic binder or organic binder or mixture thereof to bind and render the metal oxide shapeable when undried and stable when dried, selected from the following formulas consisting of:
   a) 50-95% oxide of iron and 50-5% of a mixture of clay, an organic binder or an inorganic binder, where said mixture can contain any portion of clay, organic binder or inorganic binder in any proportions provided the mixture adheres to the 50-5% compositional range,
   b) 50-85% oxide of iron, 10-2% of a transition metal oxide other than iron and 50-13% inorganic binder; and
   c) 50-80% oxide of iron, 15-5% of talc and 35-15% clay, wherein the oxide of iron is selected from the group consisting of FeO, $Fe_2O_3$, $Fe_3O_4$, hydrated iron oxide, higher oxides of iron and mixtures of such oxides.

2. A composition according to claim 1 wherein said composition is from about 50%-95% of an oxide of iron and from about 50%-5% of a mixture of clay, an organic binder or an inorganic binder, where said mixture can contain any portion of clay, organic binder or inorganic binder in any proportions provided the mixture adheres to the 50-5% compositional range.

3. A composition according to claim 1 wherein said composition is from about 50% to 95% of an oxide of iron and from about 50% to 5% of clay.

4. A composition according to claim 1 wherein said composition is from about 50% to 85% of an oxide of iron, 10% to 2% of a transition metal oxide other than iron and 50% to 13% of a mixture of clay, an organic binder or an inorganic binder, where said mixture can contain any portion of clay, organic binder or inorganic binder in any proportions provided the mixture adheres to the 50-13% compositional range.

5. A composition according to claim 1 wherein said composition is from about 50% to 80% of an oxide of iron, 15% to 5% of talc and 35% to 15% of at least one clay.

6. A composition according to claim 3 wherein said composition is from about 50% to 85% of an oxide of iron and 50% to 15% of clay.

7. A composition according to claim 4 wherein said composition is from about 50% to 85% of an oxide of iron, 10% to 5% of a transition metal oxide other than iron and 40% to 10% a mixture of clay, an organic binder or an inorganic binder, where said mixture can contain any portion of clay, organic binder or inorganic binder in any proportions provided the mixture adheres to 40-10% compositional range.

8. A heat storage composition according to claim 1, wherein said mixture of clays is selected from the group consisting of bentonite, kaoline, fire clay, ball clay, red shale clay, nontronite, montmorillonite, berdellite, protolithionite, zennwalkite, brotite and annite.

9. A heat storage composition according to claim 1 wherein said volumetric heat capacity is at least 100% of the volumetric heat capacity of a pure clay.

10. A heat storage composition according to claim 1, wherein said transition metal oxide comprises one or more oxides of cobalt, molybdenum, tungsten, vanadium, of nickel, titanium, manganese, niobium, yttrium and zirconium and combination thereof.

11. A heat storage composition according to claim 1, wherein said inorganic binders comprises one or more binders selected from the group consisting of sodium silicate, potassium silicate, ammonium silicate and other alkali metal, alkaline earth metal silicates, cements and other cementous materials.

12. A heat storage composition according to claim 1, wherein said organic binders comprises one or more binders selected from the group consisting of cellulose, carboxymethylcellulose, carboxyethylcellulose, tall oil, xanthin gum, surface active agent, flocculent, polyacrylamide, carbon black, starch, stearic acid, polyacrylic acid, polyvinyl alcohol, biopolymers, glucose, polyethylene glycol and mixtures thereof.

13. A process for retaining and/or recovering waste heat comprising the steps of contacting a hot gases or hot fluids with a composition according to claim 1.

14. A heat storage composition according to claim 1, wherein said composition is essentially asbestos free and essentially non-attriting.

15. A process for manufacturing a heat storage composition having a specific gravity from about 2.8 to about 4.0 and a volumetric heat capacity that is at least 50% higher than that of a pure clay, said composition comprising the steps of forming a mixture having the composition selected from the class consisting of:
   a) 50-95% oxide of iron and 50-4% of a mixture of clay, an organic binder or an inorganic binder, where said mixture can contain any portion of clay, organic binder or inorganic binder in any proportions provided the mixture adheres to the 50-4% compositional range,
   b) 50-85% oxide of iron, 10-2% of a transition metal oxide other than iron and 50-13% inorganic binder; and
   c) 50-80% oxide of iron, 15-5% of talc and 35-15% clay, wherein the oxide of iron is selected from the group consisting of FeO, $Fe_2O_3$, $Fe_3O_4$, hydrated iron oxide, higher oxides of iron and mixtures of such oxides;

shaping said composition into a shape; and calcining said shape at a temperature and for a time sufficient to render the shape stable.

16. A process according to claim 15, wherein the calcining time is from about 5 minutes to about 12 hours and said temperature is from about 500° C. to about 1500° C.

17. A process according to claim 15, wherein said mixture is 50-95% oxide of iron and 50-4% of clay.

18. A process for manufacturing a thermal heat sink composition having a specific gravity from about 2.8 to about 4.0 and a volumetric heat capacity that is at least 50% higher than that of a pure clay, said composition comprising the steps of forming a mixture having the composition selected from the class consisting of:

a) 50-95% oxide of iron and 50-5% of a mixture of clay, an organic binder or an inorganic binder or an inorganic binder other than clay, where said mixture can contain any portion of clay, organic binder or inorganic binder in any proportions provided the mixture adheres to the 50-5% compositional range, b) 50-85% oxide of iron, 10-2% of a transition metal oxide other than iron and 50-13% inorganic binder; and c) 50-80% oxide of iron, 15-5% of talc and 35-15% clay wherein the oxide of iron is selected from the group consisting of FeO, $Fe_2O_3$, $Fe_3O_4$, hydrated iron oxide, higher oxides of iron and mixtures of such oxides;

shaping said composition into a shape; and drying said shape at a temperature and for a time sufficient to render the shape stable.

19. A process according to claim 17, wherein said temperature is from about 80° C. to about 300° C. and said time is from about 5 minutes to about 12 hours.

20. A process according to claim 15, wherein said mixture is 50-95% oxide of iron and 50-5% of clay.

21. A process according to claim 15, wherein said mixture is 50-95% oxide of iron and 50-5% of clay.

* * * * *

UNITED STATES PATENT AND TRADEMARK OFFICE
CERTIFICATE OF CORRECTION

PATENT NO. : 5,178,785
DATED : January 12, 1993
INVENTOR(S) : Michael J. Dolan, et. al.

It is certified that error appears in the above-indentified patent and that said Letters Patent is hereby corrected as shown below:

Column 1, line 41 of the printed patent:

delete "$Fe_2O_4$" and insert ---$Fe_2O_3$---

Column 12, Claim 15, Lines 57 and 61 of the printed patent:

delete "50-4%" and insert ---50-5%---

Column 13, Claim 17, Line 11 of the printed patent delete "50-4%" and insert ---50-5%---

Signed and Sealed this

Nineteenth Day of July, 1994

Attest:

BRUCE LEHMAN

*Attesting Officer*   Commissioner of Patents and Trademarks